US009799051B2

(12) United States Patent
Sultzaberger

(10) Patent No.: US 9,799,051 B2
(45) Date of Patent: Oct. 24, 2017

(54) SYSTEMS AND METHODS FOR ENHANCED ACCESSIBILITY OF UPLOADED MEDIA

(71) Applicant: Jennifer L. Sultzaberger, Maricopa, AZ (US)

(72) Inventor: Jennifer L. Sultzaberger, Maricopa, AZ (US)

(73) Assignee: Jennifer Innovations LLC, Maricopa, AZ (US)

(*) Notice: Subject to any disclaimer, the term of this patent is extended or adjusted under 35 U.S.C. 154(b) by 268 days.

(21) Appl. No.: 14/484,244

(22) Filed: Sep. 11, 2014

(65) Prior Publication Data

US 2015/0106388 A1    Apr. 16, 2015

Related U.S. Application Data

(60) Provisional application No. 61/891,391, filed on Oct. 15, 2013.

(51) Int. Cl.
*G06Q 30/02* (2012.01)
*G06F 17/30* (2006.01)

(52) U.S. Cl.
CPC ..... *G06Q 30/0256* (2013.01); *G06F 17/3082* (2013.01)

(58) Field of Classification Search
CPC .................................................. G06F 17/3089
See application file for complete search history.

(56) References Cited

U.S. PATENT DOCUMENTS 6,910,049 B2 * 6/2005 Fenton ................ G06F 17/3089

2012/0203757 A1 * 8/2012 Ravindran ........ G06F 17/30864
707/706
2014/0222701 A1 * 8/2014 Loh ..................... G06F 17/3089
705/319

OTHER PUBLICATIONS

Bartel, Stack Overflow, http://stackoverflow.com/questions/11442442/get-user-profile-picture-by-id.*
Kirkpatrick, How-To Increase Your Website's Search Engine Ranking, http://www.infotoday.com/mls/nov02/kirkpatrick.htm.*
YouTube Help #1, https://productforums.google.com/forum/#!topic/youtube/wv_aUD-Qlvs.*
iMovie '11, https://web.archive.org/web/20150511130406/https://support.apple.com/kb/PH2279?locale=en_US).*
Social Media Examiner, http://www.socialmediaexaminer.com/hashtags/.*
wikiHow, https://web.archive.org/web/20120615135810/http://www.wikihow.com/Upload-a-Video-to-YouTube.*
The Experts Guide to Keyword Research for Social Media, http://web.archive.org/web/20100307114740/http://www.wordstream.com/articles/keyword-research-for-social-media-guide.*

(Continued)

*Primary Examiner* — Jason Liao
(74) *Attorney, Agent, or Firm* — Kang S. Lim

(57) ABSTRACT

The present invention relates to systems and methods for enhancing accessibility of content uploaded on a media sharing site. A user may interface with a computer system to identify a unique keyword. The unique keyword is not associated with any media on the media sharing platform. The unique keyword includes a hashtag preceding the keyword. Media is uploaded to the media sharing platform. The unique keyword is entered into the title and description fields for the uploaded media, while the tag field remains empty. The user may share the unique keyword to promote the uploaded media. Likewise, the user may access the media sharing platform to generate analytics.

13 Claims, 18 Drawing Sheets

(56) References Cited

OTHER PUBLICATIONS

YouTube Help #2 reference, https://productforums.google.com/forum/#!topic/youtube/ma468CKWBIE.*
Facebook URL, https://www.facebook.com/notes/equine-calculator/how-to-claim-your-vanity-url-for-your-facebook-page/474147772600069/.*
Stack Overflow Community Post, http://stackoverflow.com/questions/3034861/youtube-url-algorithm.*
Couch, YouTube Upload, http://www.makeuseof.com/tag/everything-you-need-to-know-about-uploading-videos-to-youtube/.*
Bartel Revisions, Stack Overflow, (http://stackoverflow.com/posts/11442442/revisions).*
KFC, KFC date unknown, youtube, https://www.youtube.com/user/KFCColonelSanders/videos.*
KFC, KFC—Talking Chins: Werewolf Episode 1 #HowDoYouKFC Dec. 18, 2013, youtube, KFC—Talking Chins: Werewolf Episode 1 #HowDoYouKFC.*
KFC Corporation, #HowDoYouKFC—Trademark Details Apr. 29, 2014 https://trademarks.justia.com/860/62/howdoyoukfc-86062511.html.*
Eickholt et al., #howdoyoukfc, date unknown, twitter, https://twitter.com/hashtag/howdoyoukfc.*
As part of the #HowDoYouKFC movement launched earlier this month, KFC developed a film featuring Hudson doing the world's first backflip while eating chicken. The video will now become a television ad. Jan. 14, 2017, TheStreet, https://www.thestreet.com/story/12244263/1/as-part-of-the-howdoyoukfc-movement-launched-earlier-this-month-kfc-developed-a-fil.*
Roberts, Tagmarks Jul. 13, 2015, California Law Review, vol. 105 2017, https://papers.ssrn.com/sol3/papers.cfm?abstract_id=2630195&download=yes.*
KnowEm Username Search: Social Media, Domains, and Trademarks [captured by archive.org on Sep. 11, 2012], knowem.com, https://web.archive.org/web/20120911071358/http://knowem.com/.*

* cited by examiner

SYSTEMS AND METHODS FOR ENHANCED ACCESSIBILITY OF UPLOADED MEDIA

CROSS REFERENCE TO RELATED APPLICATION

This non-provisional application is a continuation-in-part and claims the benefit of provisional application No. 61/891,391 filed on Oct. 15, 2013, entitled "Systems and Methods for Enhanced Monetization of Uploaded Media", which application is incorporated herein in its entirety by this reference.

BACKGROUND

The present invention relates to systems and methods for enhanced accessibility of uploaded videos and other media. Such systems and methods are particularly useful in the context of online activities, and may be especially useful in social media and advertising. Such systems and methods enable users to make their media more searchable, thereby enhancing page-hits and ultimately marketing efficacy and/or ad revenue that may be collected.

Currently, a number of social media sites allow users to upload their media. Some media sites also enable the uploader to collect advertisement revenue based upon the number of "hits" the user's site gets. Popular sites can elicit huge numbers of page-hits through word of mouth and sharing of the media. These large numbers of page hits can generate substantial quantities of money for a select few users. However, for the vast majority of users, their content is often lost in the herd, and relatively few page hits are actually realized. The same is true for marketers who are not particularly concerned with the direct advertisement revenue. If the content is not widely viewed, then it is ineffective as a marketing or informational tool.

One way to increase page hits is to develop a dedicated fan base which views the user's content of a reoccurring basis. However, developing this sort of fan base is difficult, especially prior to the user gaining much traction.

In order for users to generate that initial traction, the prevailing wisdom is to make the content readily searchable for the consuming audience. This has traditionally involved tagging the content extensively, and providing media descriptions that will match what a typical user types in as a search. However, despite these measures to make the media more searchable, it still tends to get lost in the vast quantity of media in existence.

It is therefore apparent that an urgent need exists for systems and methods for making content more accessible on media platforms. Such systems and methods would be able to provide increased ability to use media platforms for marketing, information sharing, or for direct advertisement revenue generation (monetization).

SUMMARY

To achieve the foregoing and in accordance with the present invention, systems and methods for enhanced media accessibility are provided. Such systems and methods enable users to have their uploaded media be more searchable in an organic manner. This enhanced search-ability enables more frequent population of the media in search engines, and therefore enables enhanced monetization through advertisements, increases marketing efficacy, and enables greater dissemination of information.

In some embodiments, a user may interface with a computer system to identify a unique keyword. The unique keyword is not associated with any media on the media sharing platform, and in some embodiments, the unique keyword includes a hashtag preceding the keyword. Identifying the unique keyword includes searching for the keyword in the media sharing platform, and selecting a new keyword if the search has results.

In some cases, a list of acceptable keywords may be generated and iteratively searched on the media searching platform for ones which generate zero matches. It may be desirable to search across multiple media platforms and only select keywords that have no matches on most or all of the platforms. The list of acceptable keywords is generated using the following variables: descriptiveness, length, visual appeal, audio appeal, emotional impact and similarity to existing keywords.

Next, media is uploaded to the media sharing platform. The unique keyword is entered into the title and description fields for the uploaded media. In some cases, the user ensures that the tag field remains empty. Additionally, the monetization settings may be configured to enable advertisements for the uploaded media. The user may share the unique keyword to promote the uploaded media. Likewise, the user may access the media sharing platform to generate analytics.

The media can be any of video content, image, audio, executable file, and text. Further, the media sharing platform can be YouTube. The user may also wish to log into their YouTube account to enable revenue generation. Any searches for keywords start from a blank search page.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
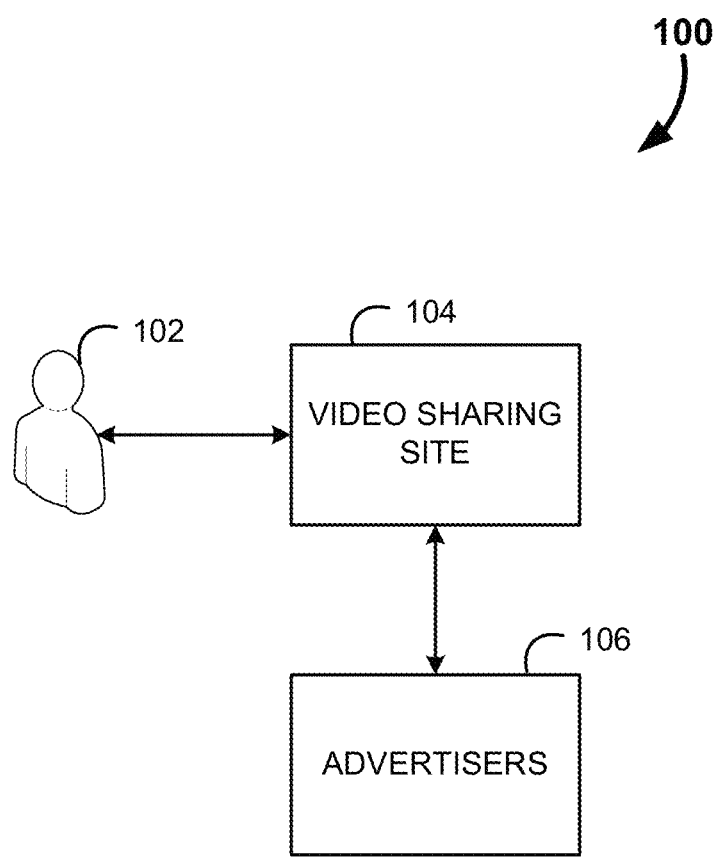
FIG. 1 is an example functional block diagram illustrating users engaging a social media platform for enhanced media monetization, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to a novel means, systems and methods for the enhancing the accessibility of media which is uploaded onto websites. These systems and methods may be particularly useful within social media settings, where existing means of media monetization via advertisement revenue are present, but which are plagued by the inability to have readily searchable media.

Additionally, novel methods of marketing services are disclosed, which allow a marketer to generate uniquely searchable terms for the above methods of enhancing the accessibility of media which is uploaded onto websites.

Note that while much of the discussion contained herein relates to media sites such as social networks, it is entirely possible that any content host may utilize the disclosed systems and methods. For example, other media sources, such as YouTube, news outlets, such as CNN online, and online retailers, such as Amazon, may all be considered "media platforms/sites" or "distribution channels" for the purposes of this disclosure. Further, advertisers may likewise be referred to as "ad providers".

Also note, that the present disclosure is aimed, in particular toward YouTube as an exemplary social media site. In fact, the systems and methods described herein work equally as well with any media platform where the media is searchable by a title and/or description. When advertisement monetization is supported, then the media can likewise be monetized by the uploader. Likewise, while the media being discussed herein tends to be directed toward videos, any media type is possible depending upon the host platform.

Further, while much of the discussion herein is directed toward the generation of revenue stream based upon advertisements, it is also possible to imagine that the disclosed systems and methods can generate other value for the user beyond advertisement revenue. This may include, for example, the ability to more effectively communicate ideas, business information, and other discourse. In fact, the present disclosure works equally well for marketers attempting to reach audiences with marketing content. In these circumstances, direct monetization of the content is not required, or even desired, since the purpose of the content accessibility is to convey a message to the audience. This message may be an advertisement or general information on a subject (such as politically motivated information).

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. MEDIA MONETIZATION

To facilitate the discussion, FIG. 1 is an example functional block diagram 100 illustrating users 102 engaging one or more media site 104. The media site 104 may in turn be in communication with advertisement providers 106. One example of an applicable media site includes YouTube, of course other media hosting sites and social networks are likewise usable.

The media site draws revenue from its ability to include advertisement space onto the webpage. The content on the webpage must be compelling enough to warrant a viewer to suffer through the advertisement nuisance. In the case of YouTube, the advertisement level has been left up to the user who provides the video being uploaded. The rationale behind this mode of operation is that the user is most capable of gauging the advertisements appropriate for the given video clip. In exchange for the added revenue, YouTube enables the sharing of a portion of the advertisement revenue with the user. This incentivizes the user to upload compelling content, and widely disseminating the YouTube web address in order to maximize views.

Advertisers 106 benefit from this arrangement by ensuring that their ads are viewed more frequently, and payments are only made when the advertisement is actually viewed.

In some embodiments, the user 102 logs into the media site 104, and uploads the media that they wish to monetize. The media then receives advertisements from the ad providers 106. By making the media highly searchable through the usage of unique hashtags, the media is able to generate more advertisement revenue than traditional media uploads.

Figure 2:
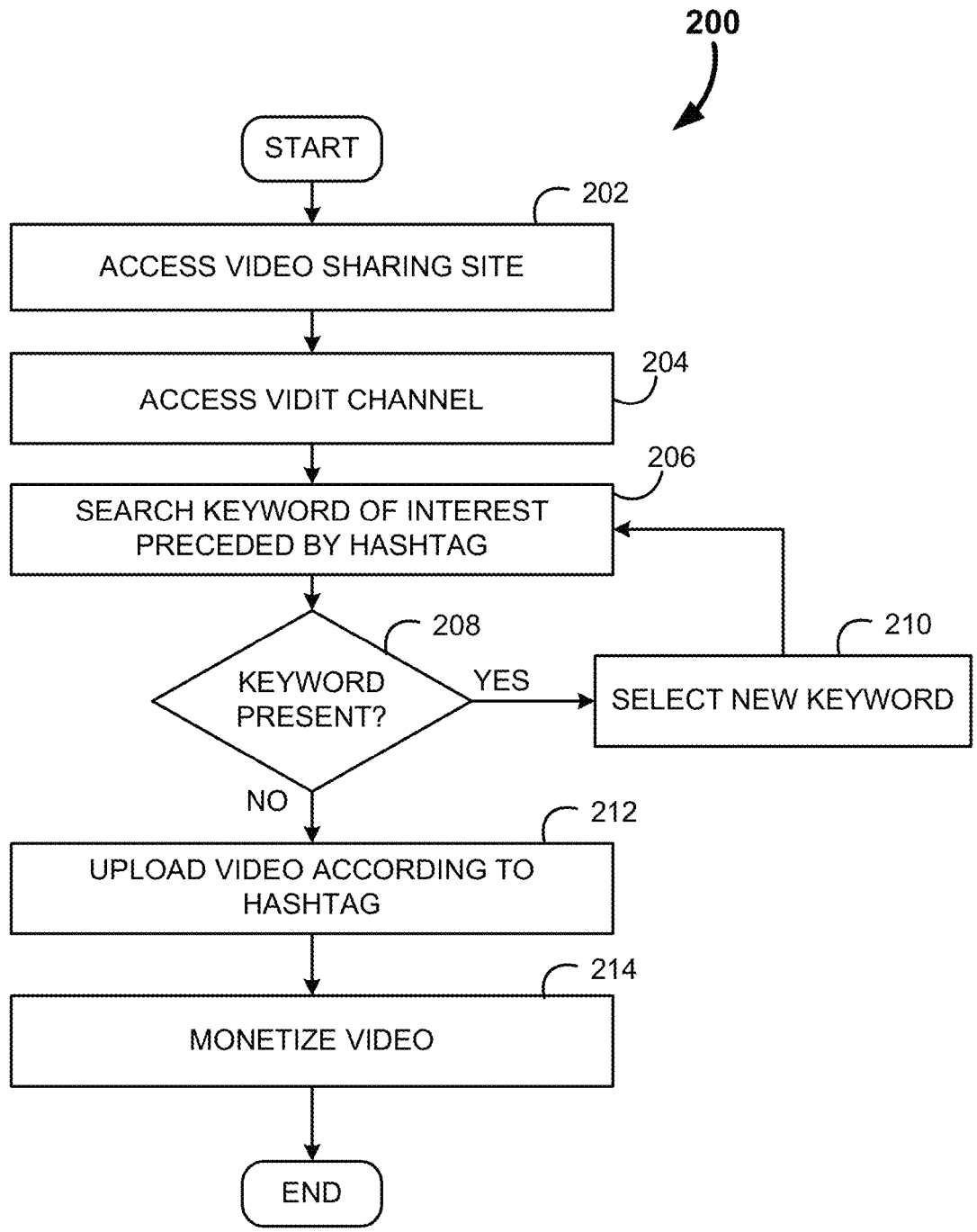
FIG. 2 is an example flow chart for the process of enhanced monetization of media, in accordance with some embodiments.

The process for generating a more searchable, and therefore more monetizable media upload will now be disclosed in reference to FIG. 2, shown generally at 200. Initially a user accesses a media sharing site (at 202). As previously noted, the media site may be a video sharing site, such as YouTube, or other site that enables the uploading and monetization of media. Likewise, the media may consist of video files, or alternate media, such as images, audio files, text articles, or even executable files.

After accessing the media sharing site, the user will open a blank screen on the sites (at 203). The blank screen ensures that any subsequent searches for keywords is an accurate representation of the keyword prevalence.

Next the user generates an account with a channel for presenting her media (at 204). The generation of an account is important because it enables the correct routing of the advertisement revenue to the user. In some particular embodiments, the channel generated is the Vidit channel generated by the marketer, which has greater exposure to the consumer base. Next the user and/or marketer searches for a keyword of interest preceded by a hashtag (at 206).

The hashtag is placed in front of the keyword in able to assist in the generation of a unique keyword. In addition, the hashtag has gained popularity due to the expansion of twitter as a media platform. Thus, keywords preceded by a hashtag are readily adopted by users, and the searching of hashtagged keywords is understood by media consumers.

Of course, it is also possible to substitute any other symbol instead of the hashtag in the generation of the unique keyword. For example, instead of the hash, an exclamation point, an @ symbol, a dollar sign, a percentage symbol, an ampersand, an asterisk, a bracket symbol, a carat symbol, an underscore, or a plus sign may be utilized. Thus, it is considered that anytime within this disclosure the term "hashtag" is used, this term describes a class of special symbols as outlined above.

Next, the media platform queries its databases to determine if the hashtagged keyword is presently being utilized (at 208). If the hashtag keyword is already being utilized, the user and/or marketer selects a new keyword (at 210) and performs another search utilizing the newly selected keyword (at 206). In this manner the user and/or marketer recursively searches various keyword combinations in order to identify a hashtag keyword that is unique.

Figure 3:
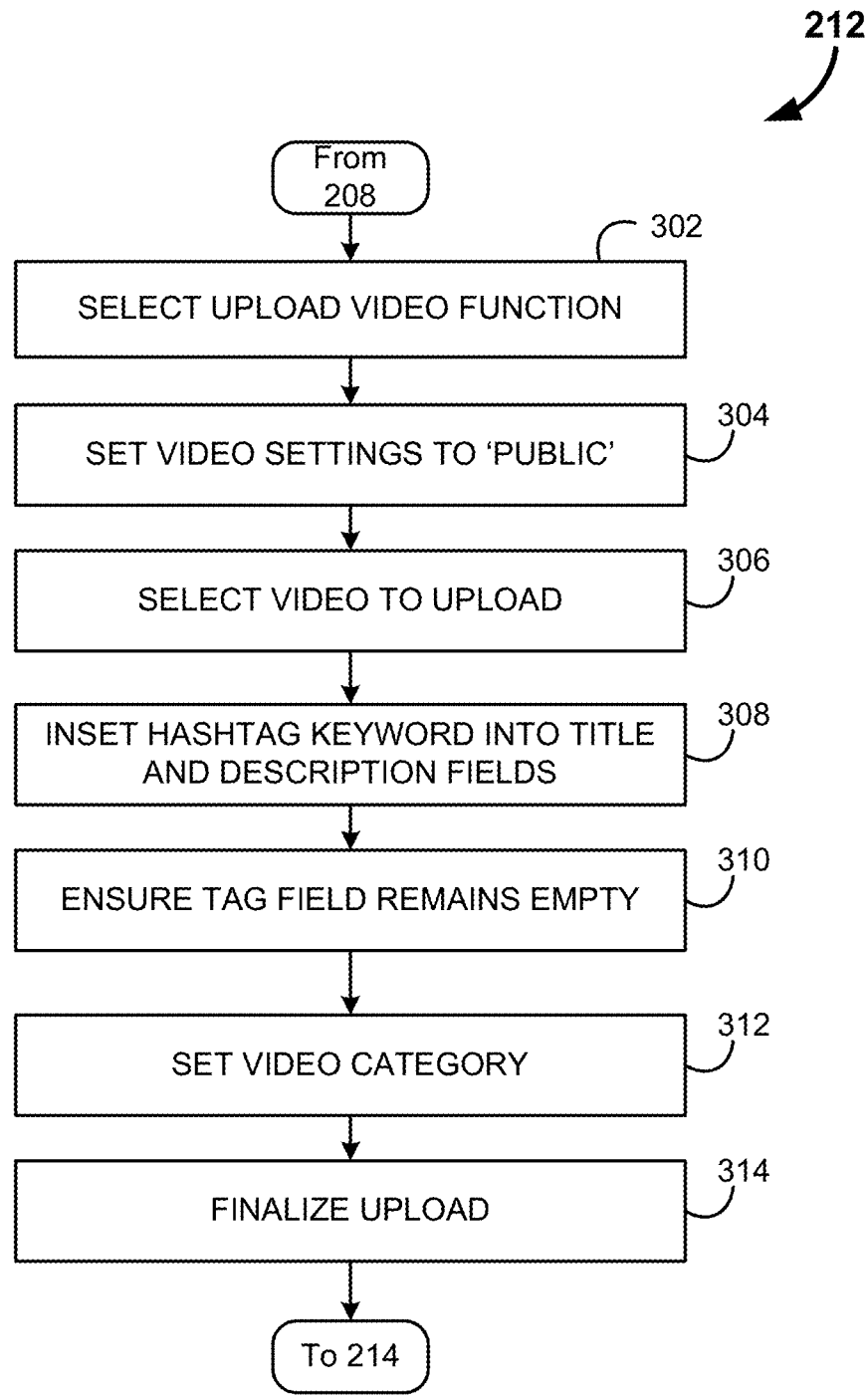
FIG. 3 is an is an example flow chart for the sub-process of media uploading, in accordance with some embodiments.

Once a unique hashtag keyword is identified, the media may be uploaded according to the hashtag (at 212). This process of media uploading is disclosed in greater detail in reference to FIG. 3. In this example process, the user selects an upload function from the media platform (at 302). Often, media sharing sites include a button labeled "upload" in order to initiate the media sharing.

Next, in this embodiment, the user selects a number of configurations for the media. This may include designating that the media is to be public (at 304), and may include other configurations dependent upon the media sharing platform. For example, some media sharing platforms may require designation of viewer guidelines (e.g., general audiences, mature content, etc.).

Subsequently, the media is selected from the user's computer for uploading (at 306). This media may be provided to the marketer for direct upload to the Vidit channel in some embodiments. This process of maintaining custody of the material enables the marketer to provide value added services to the user through their large consumer following. Media selection typically includes browsing the user's local files for the appropriate media file, selecting it, providing it to the marketer, and uploading it onto the Vidit site. The media site typically provides a status bar indicating the progress of the media upload.

Next, based upon the media sharing platforms requirements, the user and/or marketer may be allowed to insert descriptors for the media in order to allow for media searching and for display to viewers. In some embodiments, this includes inserting the hashtag keyword, which was determined to be unique, into the media title and description fields (at 308). In contrast, the tag field should remain empty (at 310). This ensures that searches for the hashtag keyword yield the appropriate results.

Additionally, if required by the media sharing platform, the media category is set (at 312), and any additional designators for the media are set. For example, some media platforms may require the type of media be designated (e.g. video, image, audio file, etc.).

Lastly, the uploading of the media may be finalized (at 314) whereby all the user and/or marketer's inputs are saved. The media then becomes available to the public for viewing.

Figure 4:
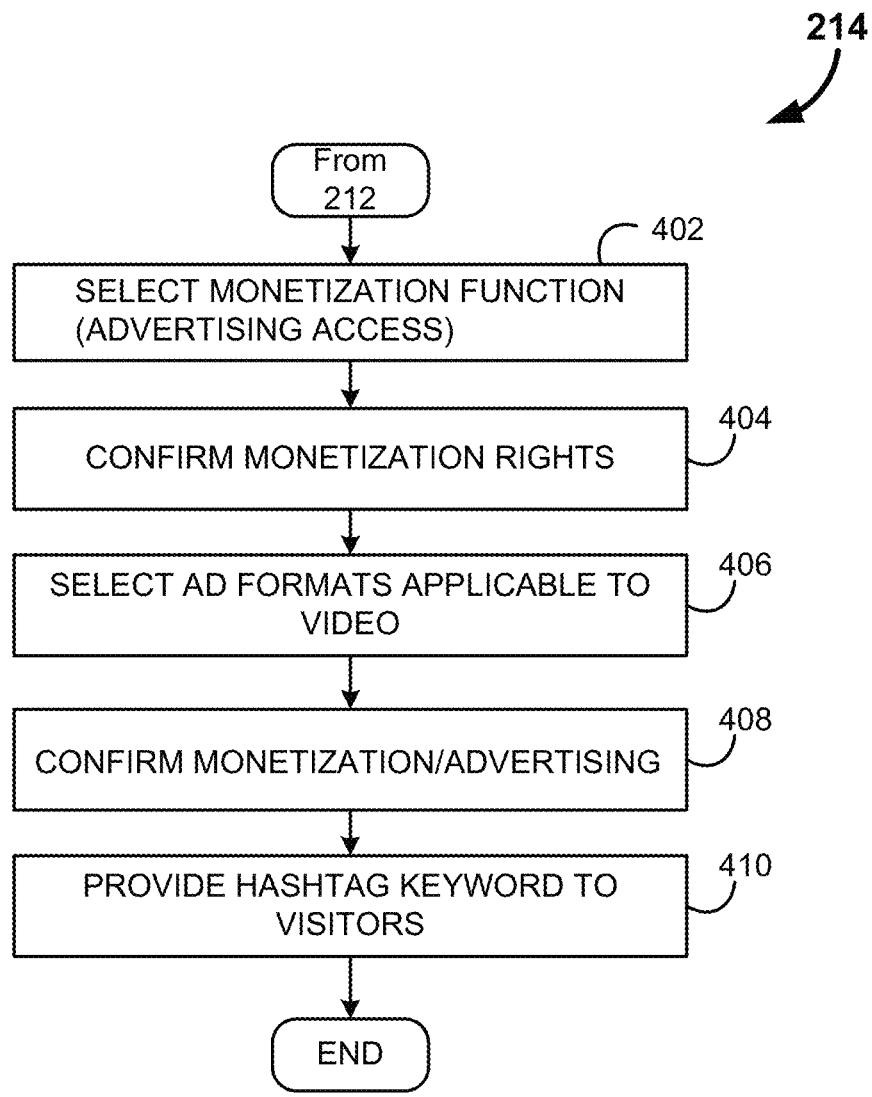
FIG. 4 is an example flow chart for the sub-process of monetization, in accordance with some embodiments.

Returning to FIG. 2, after media uploading, the process concludes with the monetization of the media (at 214). This monetization step is further disclosed, in greater detail, in relation to the flowchart illustrated in FIG. 4.

In this example flow diagram, the monetization function within the media sharing platform is selected by the user and/or marketer (at 402). In some media platform it is also possible that monetization occurs automatically, or is compulsory. In these scenarios, the selection of the monetization function is not required.

The Vidit marketer is often required to confirm that the monetization rights belong to them via the negotiated subscription based marketing model (at 404). This step ensures that the media sharing platform does not get dragged into copyright disputes among independent parties. The user and/or marketer may also be able to select advertisement formats applicable, or desired, for the media (at 406).

For example, many media types lend themselves to banner advertisements. However, video content may also be well situated to play a short commercial prior to the video. Likewise, an intermediate advertisement may block out media in the format of pictures or text for a set period of time. Additionally, some media itself may include product placement or product critiques. These media types themselves may be eligible for advertisement revenue. In media platforms that enable selection of the advertisement format, typically the more advertisements selected impacts the rate of monetization, but may also impact the viewership.

After advertisements are formatted, the user and/or marketer confirms the monetization configurations (at 408). The user and/or marketer may then disseminate the hashtag keywords to others (at 410) in order to initiate the advertisement revenue stream. As the hashtag keyword is unique to the user's content, it will naturally and organically migrate to the top of searches performed for it. This occurs immediately on the media platform, but will rapidly migrate out into search engine results. Additionally, it has been found that the content generally spreads rapidly to the top of domestic search engine results in a matter of days. Additionally, the content organically expands to the top of search results of international search domains in a matter of weeks. Thus, the foregoing described methods enable global reach by the marketer and user in unprecedented time.

Top search result positions are coveted as directly and substantially impacting page views and associated revenue generation. Unique hashtagged keywords enables the user to maintain this prime real estate, and minimizes the risk of viewers being sidetracked from the intended media.

Further, by linking the hashtagged keyword to a broader marketing campaign, the brand recognition is exponentially impacted. This ensures interested customers are seeking out only the intended media, and won't be diverted to related competitor products.

II. MARKETING SERVICES

In addition to media monetization, as discussed above, the present disclosure will also address the usage of unique hashtags for marketing services. These methods may be performed directly by a marketer, or as a consulting service provided to a business, individual, or group.

Again, the purpose of the disclosed methods is to make a term more searchable by content consumers. Unlike the above example, however, the purpose of increasing accessibility of the content lies not in direct advertisement monetization, but rather via the intrinsic value of disseminating the content more broadly. Companies, political lobbies, and concerned individuals have a strong need to reach target audiences with messages. These messages may be intended to entice the target audience to alter behavior (such as advertisements to entice buying of a product, or swaying individuals to recycle more, for example), or may merely be for the dissemination of information that the group or individual deems important (information relating to political candidates, for example).

Regardless of the motivation for reaching out to audiences, the content needs to be easily searchable in order to increase accessibility. Google Announced Oct. 11, 2013 that they now recognize the # symbol as part of the algorithmic search. Similar methods of generating a hashtag keyword, as provided above may be employed for increasing content searchability. Unlike the above methods, however, monetization via advertisement embedding may be a secondary consideration, or even not desired. For example, if the content being provided is a promotional video for a product, layering on additional advertisements may detract from the message. It may even discourage potential customers from viewing the promotional video. Since the value of the video is in its message, ad monetization may be bypassed in exchange for more effective messaging to the target audience.

An internal marketer would, as with the above example, iteratively search the media platform for the keyword of interest preceded by a hashtag (or other desired special character). If the keyword is already existent on the platform, then variants of the keyword may be employed until a unique hashtagged keyword is identified. Some degree of art is employed in generating a hashtag keyword that is unique, catchy, and adequately descriptive of the content. Considerations on choosing a hashtagged keyword include, but are not limited to, their descriptiveness of the company/individual/goods/services or content, length of the keyword, how memorable the keyword is, how close the keyword is to other existing keywords (to avoid misdirection of the viewer), visual and/or acoustic appeal, and generally how it will emotionally impact the target audience.

For example, if the content is an advertisement for an energy drink, the keyword #fitenergy may be preferable to #lowcalorieenergybeverage. Fit energy is descriptive enough to give the user an idea of the product's features. It is catchy and short, therefore easily remembered. As previously noted, some degree of skill may be employed to generate the "best" unique hashtagged keyword for a given piece of content.

Since some experience and skill is employed in generating a keyword, experts in the field may emerge which provide these marketing services as a third party consultant, such as the Vidit group. In this role, the marketer must first learn about the company, goods/services being provided, and the content type to be uploaded. The marketer then employs an iterative search of the platform to identify suitable hashtagged keywords. In some instances, the marketer may wish to search multiple sites for suitable hashtagged keywords, and then select from the keywords that are common for all the sites that are of interest. In this manner, a persistent keyword may be employed in the marketing of the content across multiple social media and other content platforms.

Once acceptable hashtag keywords have been identified, the marketer may share the results with the client for selection of the keyword to be actually employed. The marketer (or the client directly) then uploads the content to the desired platforms utilizing the unique hashtag. Again, advertisement monetization may, or may not, be desired for the content based upon if its goal is presenting marketing or informational material to the user versus direct ad monetization.

In this manner, companies, individuals and groups may make their content more accessible to others. These tools may increase effectiveness of marketing materials, and enables enhanced searchability to informational materials. In many cases, simply one #keyword prompting, or search of a # keyword results in the video appearing directly, or as one of the top results in a search engine. This results in buyers getting the message the clients want them to know about the business being promoted.

III. EXAMPLES

Now that the process for the enhanced accessibility of media has been disclosed in considerable detail, attention will be turned toward example screenshots of the process being implemented on YouTube, a video sharing site, within the context of direct advertisement monetization. As previously noted, the above disclosed process for media monetization may be performed with any appropriate media sharing platform, and any appropriate media type; however, for the sake of simplicity, these example screenshots will be directed toward video media being uploaded onto YouTube. Also note that a similar process may be employed where direct monetization is not a primary consideration, but rather increasing accessibility of the content is of paramount importance, as discussed in the previous section.

Figure 5:
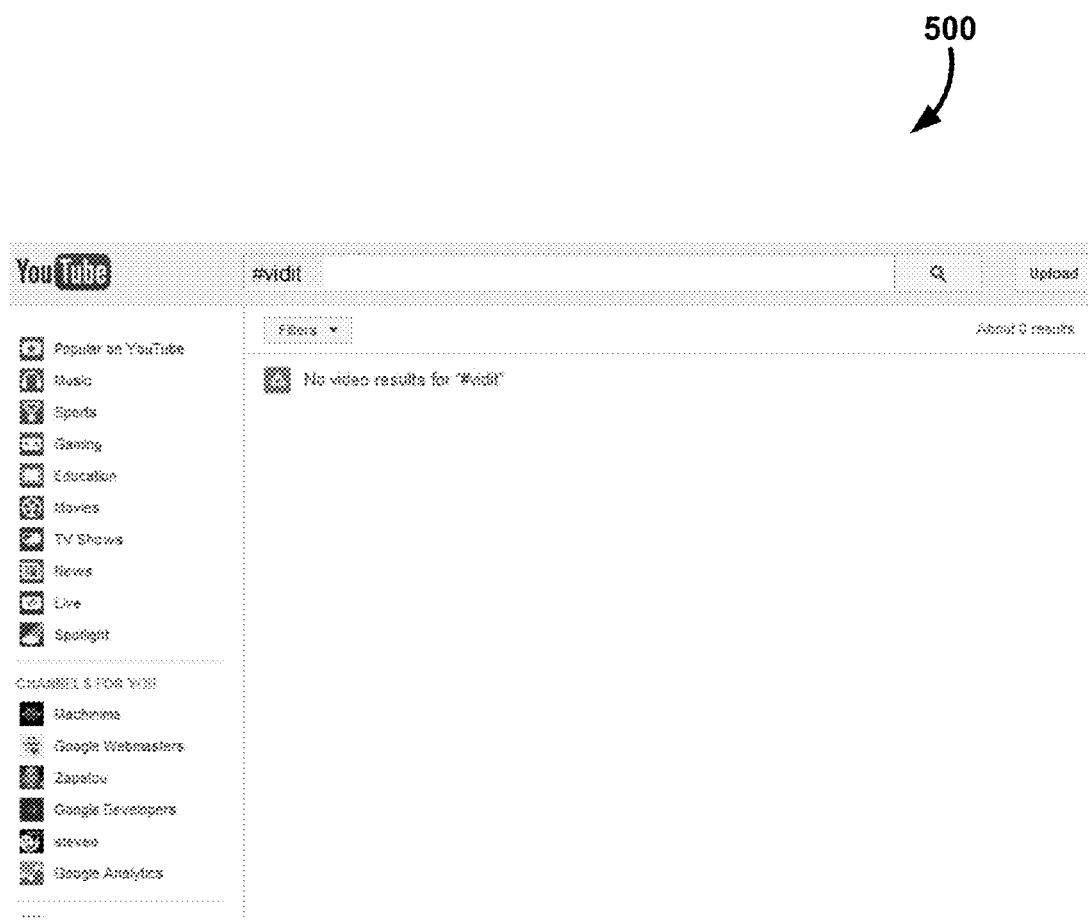
FIGS. 5-14 are example screenshots for the monetization of media, in accordance with some embodiments.

FIG. 5 initially shows a YouTube search page, shown generally at 500. The user has logged into the website, and has started with a blank search page initially. The user then selects a keyword preceded by a hashtag to determine if it is unique. In this example screenshot, the user searches for "#vidit" which returns a result that indicates that no other videos have been uploaded that are related to this term.

Figure 6:
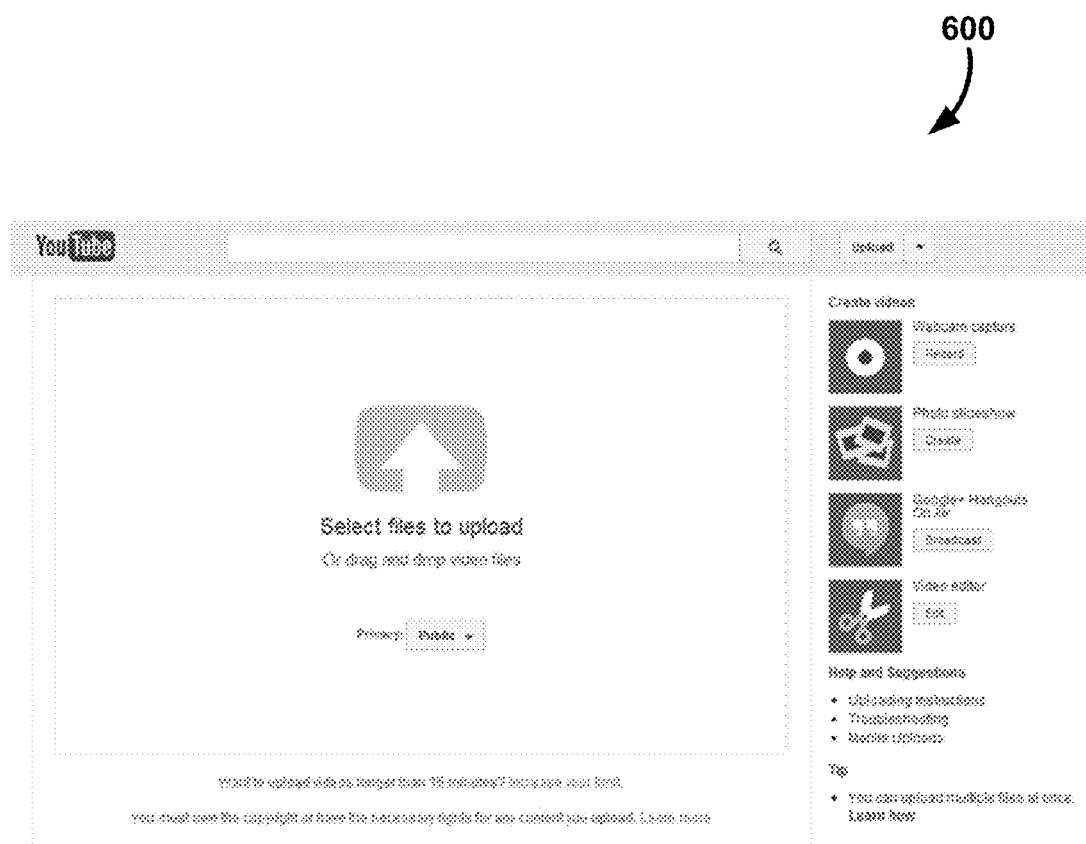

Now that the user has identified a unique hashtag keyword, the user selects the "upload" button in order to get to the page for loading the video file, as seen at 600 of FIG. 6. The privacy setting, in this example, is selected as being public.

Figure 7:
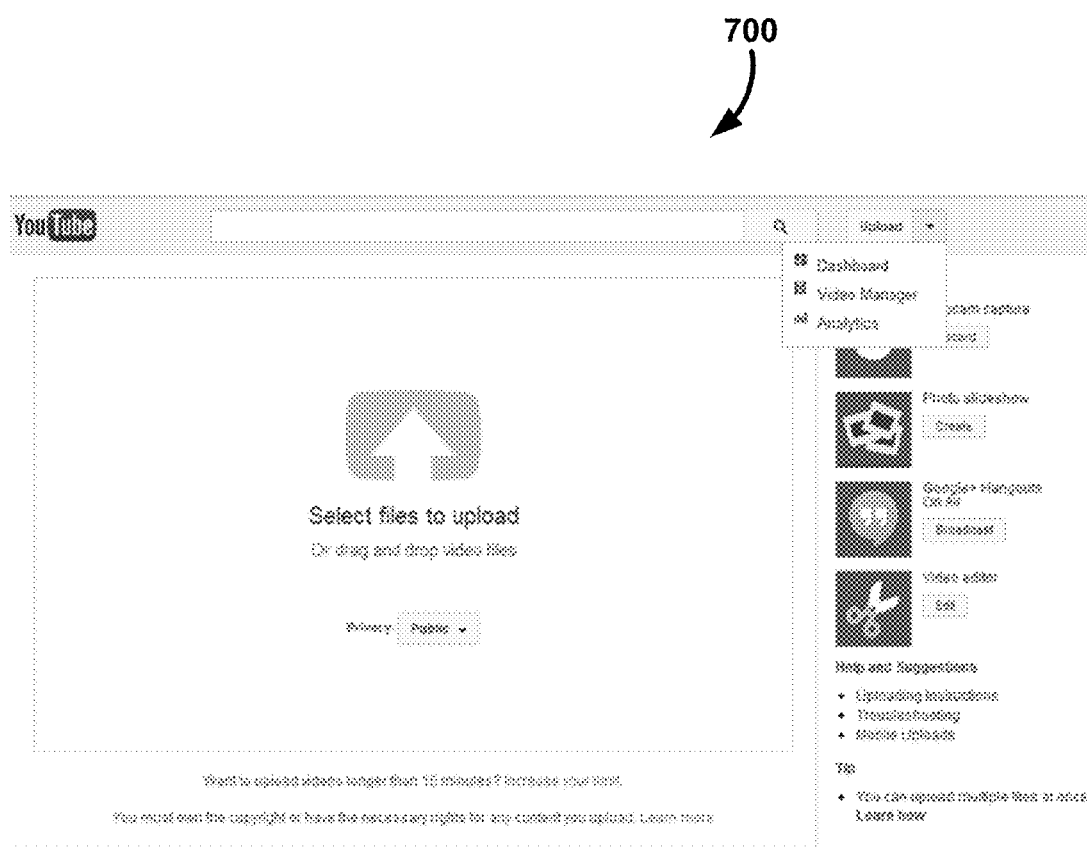

The user, in this example, may then select the pull-down menu, shown generally at 700 of FIG. 7, in order to select the appropriate function. Here, the user selects the "video manager" option in order to be directed to a page where the video file may be uploaded.

Figure 8:
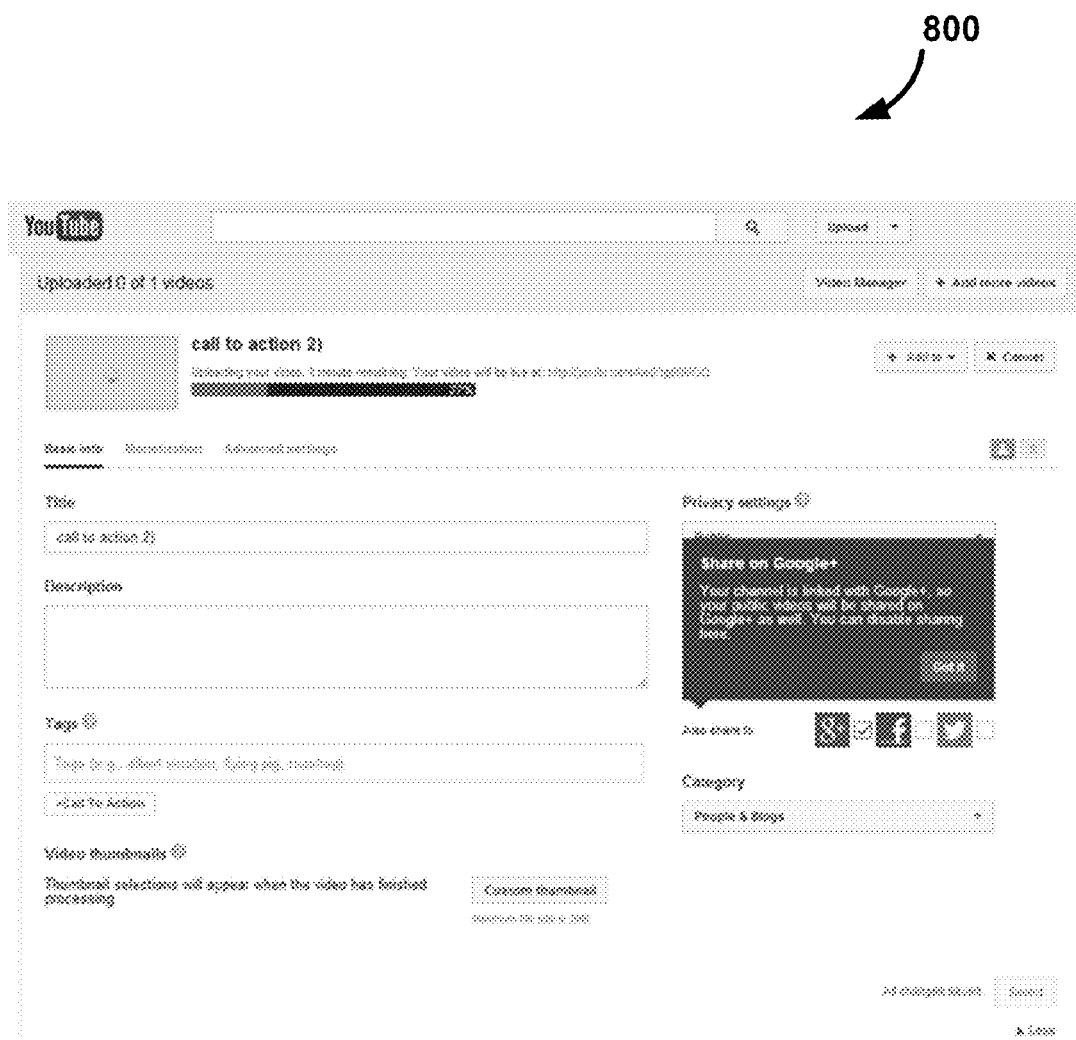

The uploading screen is seen generally at 800 of FIG. 8. This example screenshot enables the user to select the file to be uploaded, provides a status of the upload, and enables the inputting of information related to the video file. As seen in this example image, the title if often defaulted upon upload to the file name. This is updated by the user to the unique hashtag keyword in order to ensure the desired searching outcomes. Replacement of title names in crucial to the proper functioning of the disclosed methods.

Figure 9:
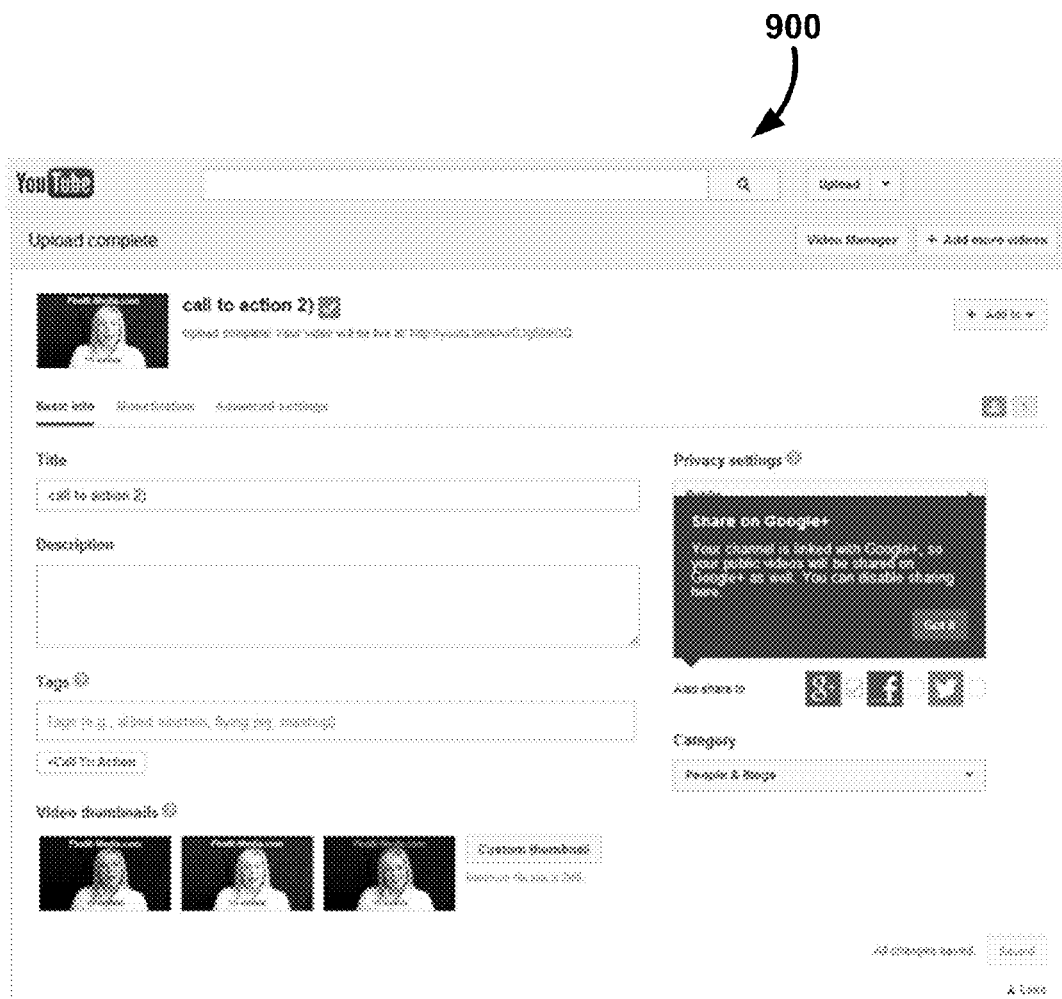
Figure 10:
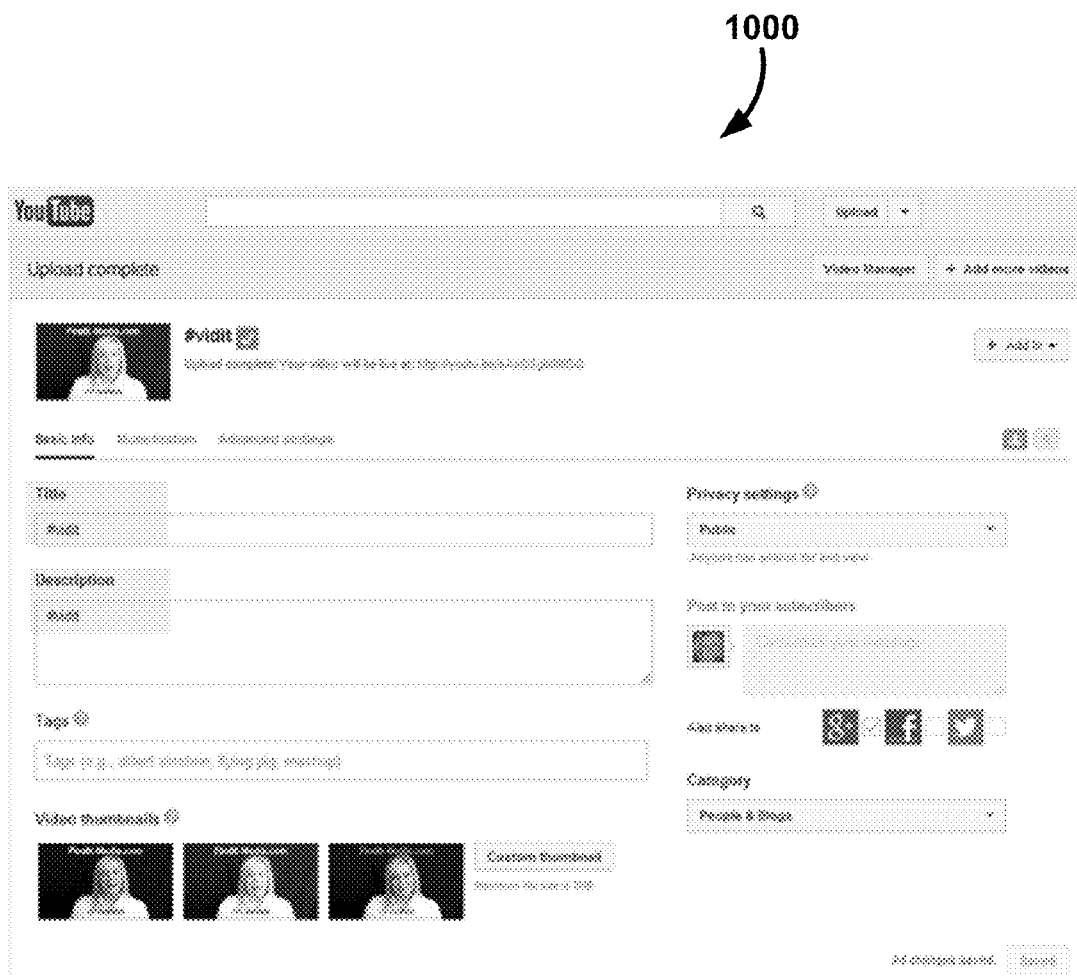

By way of example, FIG. 9 illustrates that the file has been fully uploaded, shown generally at 900. In FIG. 10 the user has replaced the title and the description fields with the unique hashtag keyword, seen generally at 1000. Note that the 'tag' field remains blank to ensure proper searching. At this stage the video category may also be selected, and the privacy setting may be updated.

Figure 11:
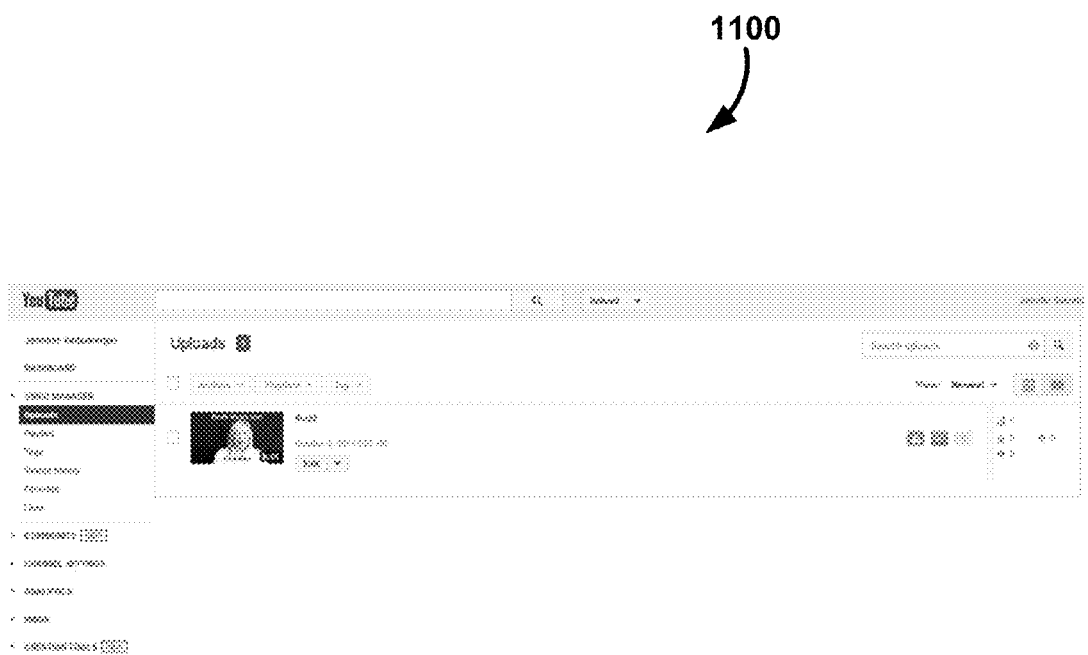

All changes to the upload are saved, and the user may be redirected to a page that displays their uploaded files, seen generally at 1100 of FIG. 11. From this page the user is able to update the monetization settings for the video by selecting the "$" icon next to the uploaded video. Again, this direct ad monetization may be of importance in circumstances where the content is being provided for that purpose. This monetization step may be avoided, however, when the primary purpose of the unique hashtagged keyword is merely to increase the accessibility of the content.

Figure 12:
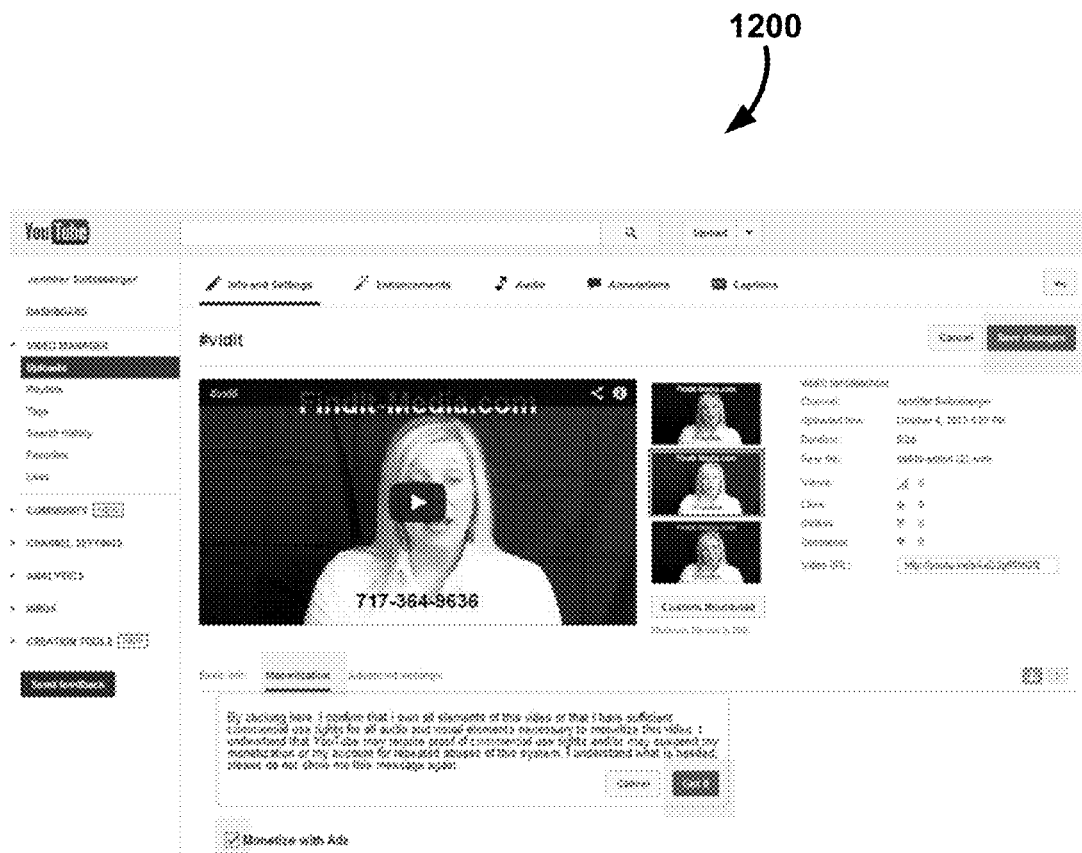
Figure 13:
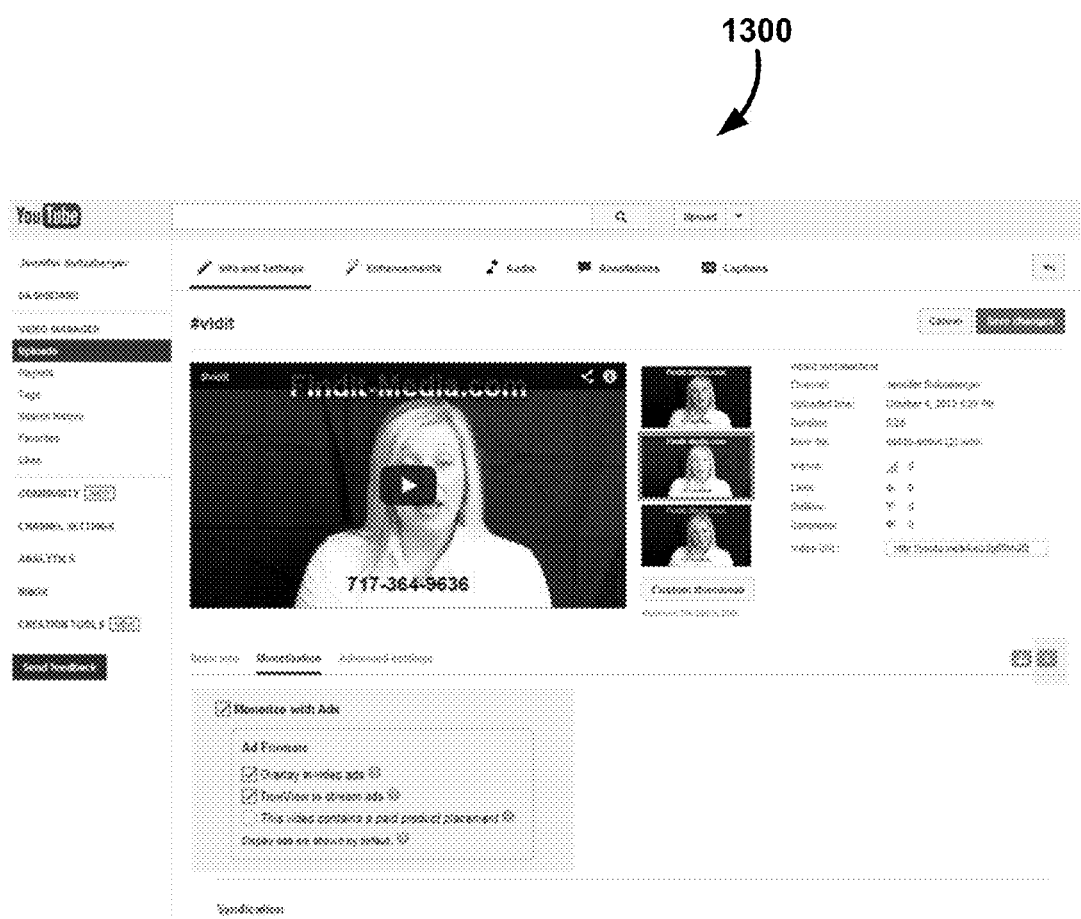

Returning to the example screenshots, selecting the "$" icon takes the user to a monetization screen, shown at 1200 of FIG. 12, where the user confirms that they have the rights to earn revenue on eth uploaded content. After confirming this, the user is directed to a page where monetization configurations are made. These configurations include the selection of which advertisements are to be displayed in association with the video, for example. This monetization configuration page may be seen generally at 1300 in reference to FIG. 13. Duplicate content may not be monetized more than once nor may it be uploaded more than once to YouTube.

Figure 14:
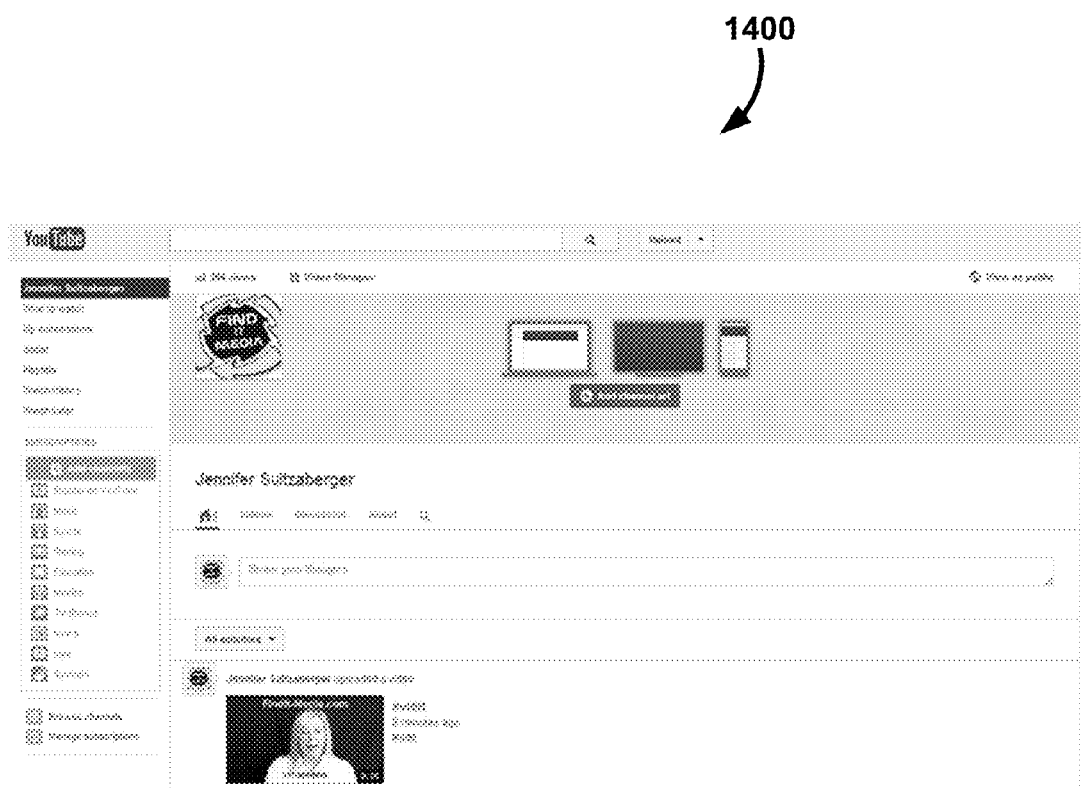

Lastly, by confirming the monetization selections, the user is sent to a final confirmation screen, shown generally at 1400, in relation to FIG. 14. This confirmation screen ensures the user that the video has been fully uploaded and is now ready for public viewing.

As previously noted, the use of a unique hashtag keyword inserted into the title and description fields, while maintaining the tag field blank, ensures that the media file is organically routed to the first position when searched for. This occurs very quickly within the host platform, and migrates over time to other search engines.

Figure 15A:
FIGS. 15A-15D are example screenshots illustrating the effectiveness of the disclosed process for monetization, in accordance with some embodiments.

FIGS. 15A-15D are example screenshots illustrating the effectiveness of the disclosed process for monetization, in accordance with some embodiments. As can be seen in FIG. 15A at 1500A, the hashtag coupled with the unique keyword video comes up as the number one search result in YouTube within minutes of being uploaded.

Figure 15B:

Shortly thereafter, a hashtagged video organically becomes available on search engines that are associated with the media platform. YouTube is owned by Google, and as such the hashtagged video organically becomes the first search result in Google search engine very rapidly after video upload (typically within a day). This can be seen as illustrated in FIG. 15B at 1500B.

Figure 15C:
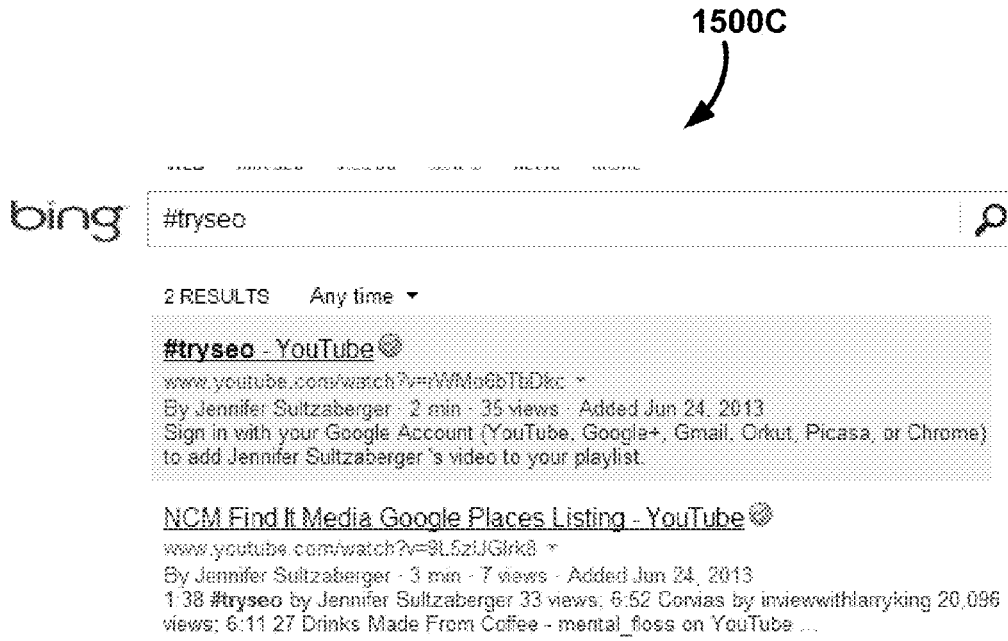
Figure 15D:

Within a few weeks, the hashtagged keyword can be inputted into other disassociated search engines and the media file is still seen as the first result. FIGS. 15C and 15D illustrate search results using Bing and Yahoo! Search engines, at 1500C and 1500D respectively. As previously mentioned, the growth of the content accessibility occurs organically in domestic search engines within a few days of launch. Additionally, the content expands into international searches within a few weeks, without the need for geo-targeting. This is a major advantage over prior marketing services which required geo-targeting in order to be found, with any reliability, within foreign search engines. An additional benefit of the disclosed methods is that within the primary search engine, the non hashed keyword will also be indexed and will be viewable as a result of searches.

Figure 16:
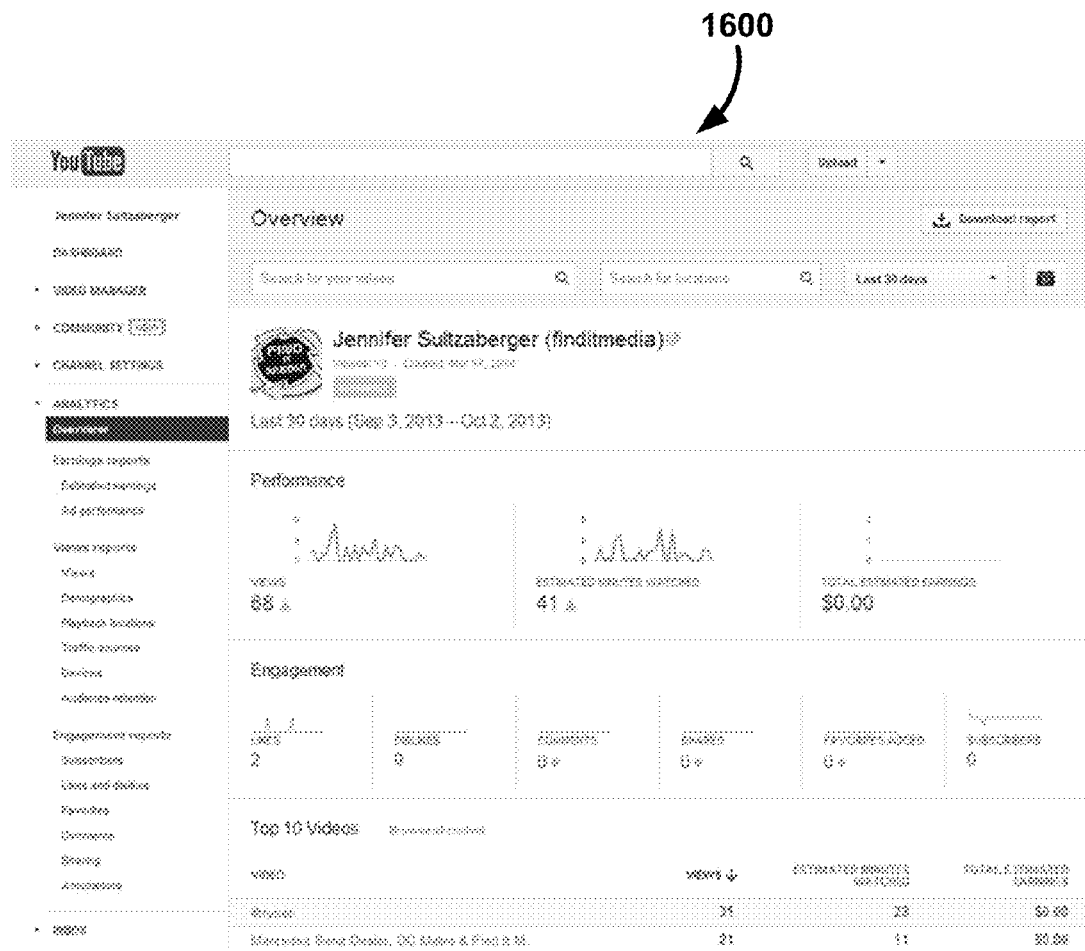
FIG. 16 is an example screenshot for media analytics, in accordance with some embodiments.

An additional benefit of using an isolated video (media file associated with a unique hashtag keyword) is the ability for the user to go back into the media platform and leverage onboard analytics. For example, FIG. 16 is an example screenshot for media analytics on YouTube, seen generally at 1600.

These analytics may provide the user an indication of media playback locations and traffic sources. These analytics may be utilized by the user to assist in business planning by assisting in the targeting of specific business channels and target audiences.

IV. SYSTEM EMBODIMENTS

Figure 17A:
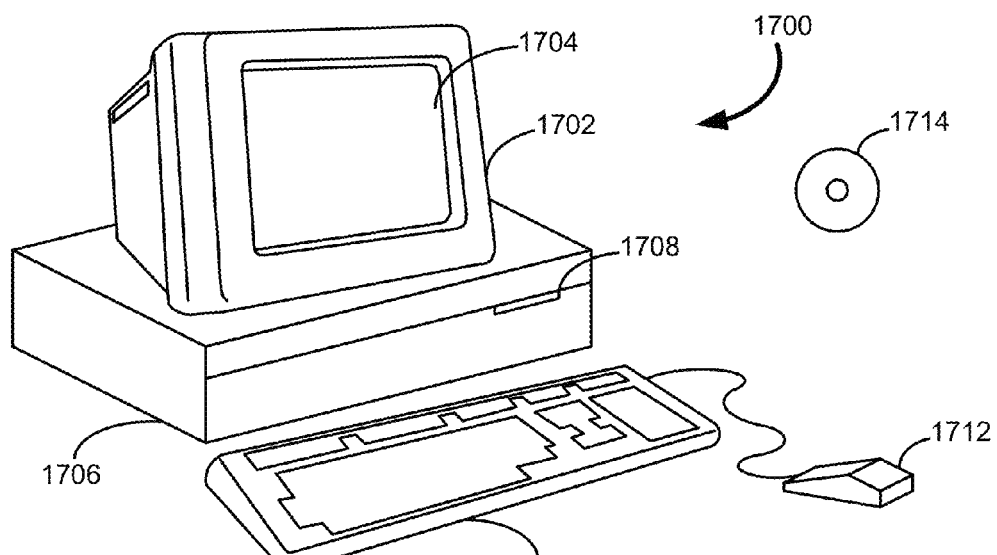
FIGS. 17A and 17B are example illustrations for computer systems configured to embody the media monetization system, in accordance with some embodiments.
Figure 17B:
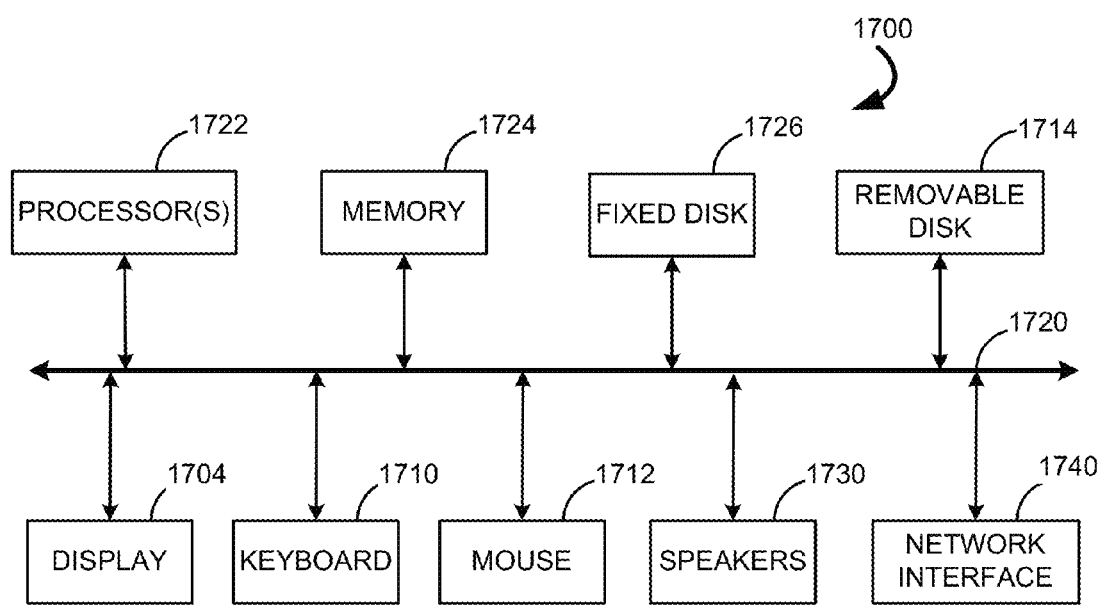

FIGS. 17A and 17B illustrate a Computer System 1700, which is suitable for implementing embodiments of the present invention. FIG. 17A shows one possible physical form of the Computer System 1700. Of course, the Computer System 1700 may have many physical forms ranging from a printed circuit board, an integrated circuit, and a small handheld device up to a huge super computer. Computer system 1700 may include a Monitor 1702, a Display 1704, a Housing 1706, a Disk Drive 1708, a Keyboard 1710, and a Mouse 1712. Disk 1714 is a computer-readable medium used to transfer data to and from Computer System 1700.

FIG. 17B is an example of a block diagram for Computer System 1700. Attached to System Bus 1720 are a wide variety of subsystems. Processor(s) 1717 (also referred to as central processing units, or CPUs) are coupled to storage devices, including Memory 1724. Memory 1724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1726 may also be coupled bi-directionally to the Processor 1717; it provides additional data storage capacity and may also include any of the computer-readable media described below. Fixed Disk 1726 may be used to store programs, data, and the like and is typically a secondary storage medium (such as a hard disk) that is slower than primary storage. It will be appreciated that the information retained within Fixed Disk 1726 may, in appropriate cases, be incorporated in standard fashion as virtual memory in Memory 1724. Removable Disk 1714 may take the form of any of the computer-readable media described below.

Processor 1717 is also coupled to a variety of input/output devices, such as Display 1704, Keyboard 1710, Mouse 1712 and Speakers 1730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1717 optionally may be coupled to another computer or telecommunications network using Network Interface 1740. With such a Network Interface 1740, it is contemplated that the Processor 1717 might receive information from the network, or might output information to the network in the course of performing the above-described media accessibility process. Furthermore, method embodiments of the present invention may execute solely upon Processor 1717 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, the present invention provides systems and methods for enhanced media accessibility for the purpose of reaching greater audiences or for direct media monetization. Such systems and methods enable users to improve the search ability of their media, and thereby enhance advertisement revenue, reach to target audiences, and dissemination of information.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for uploading media onto a media sharing platform, the method comprising:
   generating a marketer channel on the media sharing platform;
   a marketer receiving media from a client, wherein the marketer is a third party to the client, and wherein the client is the source of the media either directly or via an advertisement agency;
   the marketer authoring a unique keyword, wherein the unique keyword is not associated with any media on the media sharing platform, and wherein the marketer performs an iterative search on a plurality of media sharing platforms with various potential keywords until a unique keyword is identified across all the plurality of media sharing platforms;
   uploading, using a processor, the media to the media sharing platform;
   including the unique keyword into at least one of a title and description fields for the uploaded media;
   the marketer ensuring that the tag field is empty; and
   incorporating the unique keyword into at least one marketing campaign discrete from the media sharing platform.

2. The method of claim 1, wherein the unique keyword includes a symbol preceding the keyword, wherein the symbol includes at least one of an exclamation point, an @ symbol, a hashtag, a dollar sign, a percentage symbol, an ampersand, an asterisk, a bracket symbol, a carat symbol, an underscore, and a plus sign.

3. The method of claim 1, wherein the media is at least one of video content, image, audio, executable file, and text.

4. The method of claim 1, wherein the media sharing platform is YouTube.

5. The method of claim 1, further comprising increasing value of the uploaded media by setting monetization for the uploaded media to enable advertisements.

6. The method of claim 4, further comprising starting from a default search page.

7. The method of claim 1, wherein the iterative searching includes opening a default screen of the media sharing platform before initializing the search.

8. The method of claim 1, further comprising accessing the media sharing platform to generate analytics.

9. The method of claim 1, further comprising sharing the unique keyword to promote the uploaded media.

10. The method of claim 1, wherein the unique keyword is authored by generating a list of acceptable keywords and iteratively searching the media searching platform for ones which generate zero matches.

11. The method of claim 10, wherein the unique keyword is authored by iteratively searching across more than one media platforms and selecting keywords that have no matches on each of the media platforms.

12. The method of claim 10, wherein the unique keyword is authored by presenting the keywords that result in zero matches to the content author for selection of the unique keyword.

13. The method of claim 10, wherein the list of acceptable keywords are generated using the following variables: length, and similarity to existing keywords.

* * * * *